United States Patent [19]

Wallerstein, Jr.

[11] 4,003,026

[45] Jan. 11, 1977

[54] VAULT SECURITY SYSTEM

[76] Inventor: Herbert L. Wallerstein, Jr., 1704 Ambassador, Beverly Hills, Calif. 90210

[22] Filed: July 7, 1975

[21] Appl. No.: 593,267

[52] U.S. Cl. ........................ 340/149 A; 340/149 R

[51] Int. Cl.² .......................................... H04Q 3/00

[58] Field of Search ............... 109/3, 9; 340/149 A, 340/51, 149 K, 147 MD; 235/61.11 R

[56] References Cited

UNITED STATES PATENTS

| | | | |
|---|---|---|---|
| 2,914,746 | 11/1959 | James | 340/149 A |
| 3,665,448 | 5/1972 | McGlinchey | 340/224 X |

FOREIGN PATENTS OR APPLICATIONS

| | | | |
|---|---|---|---|
| 493,979 | 6/1953 | Canada | 109/3 |

*Primary Examiner*—Harold I. Pitts

*Attorney, Agent, or Firm*—Larson, Taylor and Hinds

[57] ABSTRACT

A vault security system is provided for the storage of valuables with the system having specific means for the exclusion of unauthorized persons therefrom. The security system comprises a plurality of corridors, with storage vaults therein, a plurality of holding mechanisms having a series of doors for receiving and releasing persons, one of the holding mechanisms located at the entrance to each corridor, and a plurality of access mechanisms, one of which corresponds to each of the corridors. The access mechanism is operable in conjunction with the doors in the corresponding holding mechanism for gaining access to that corridor. The access mechanism will deny access to all non-corresponding corridors and cooperate with the holding mechanism thereof for holding an unauthorized intruder.

7 Claims, 4 Drawing Figures

VAULT SECURITY SYSTEM

BACKGROUND

1. Field Of The Invention

This invention relates to a vault security system and, more particularly to systems for the storage of valuables designed to prevent access thereto by unauthorized personnel.

2. Description Of The Prior Art

Prior art security systems for protecting valuables such as described in U.S. Pat. No. 3,726,238 and 2,004,551 provide holding mechanisms preventing unauthorized persons from exiting a selected area once it has been determined that such entry was unauthorized. Such systems suffer a number of disadvantages intrinsic in, for example, the mechanism used to identify persons as unauthorized and the mechanisms by which the identified unauthorized persons are detained. In these systems the identification process involves little more than the unauthorized person attempting to leave the selected area after the person has come in contact with and tried to take the protected valuables. The detention mechanisms of such systems do not operate automatically following unauthorized intrusion and do not shield all security system personnel from possible attack by the intruder.

Another type of prior art system is described in U.S. Pat. No. 798,466 and provides for a detention mechanism which detains a person giving a fire alarm until the arrival of an official, in answer to the alarm, who releases the detained person. This system suffers a disadvantage in that it does not discriminate between valid and false fire alarms, and thus detains all persons.

Summary Of The Invention

The present invention provides for a vault security system that overcomes the disadvantages associated with prior art devices. This invention provides for an access mechanism that automatically determines if a person is making an authorized or unauthorized entry before that person comes in contact with or has an opportunity to take the protected valuables. This invention also includes an automatic holding mechanism. The holding mechanism completely isolates the person seeking access to the vaults from all personnel associated with the vault system. Further this invention does not detain an authorized entrant longer than the period of time required to electronically check his authorization.

In accordance with a preferred embodiment of the invention, a vault security system for the storage of valuables and the exclusion of unauthorized intruders is provided which comprises a plurality of corridors, each with an entrance and each containing a plurality of vaults, a plurality of holding mechanisms, one of the holding mechanisms located at the entrance to each corridor for holding unauthorized intruders, a common hall into which all holding mechanisms open, and a plurality of access means, each of the access means corresponding to a corridor or a combination of corridors for allowing access to that corridor or combination of corridors.

Additional features and advantages of the invention will be set forth in , or apparent from, the detailed description of the preferred embodiments of the invention found hereinbelow.

DETAILED DESCRIPTION OF THE PREFERRED EMBODIMENTS

Figure 1:
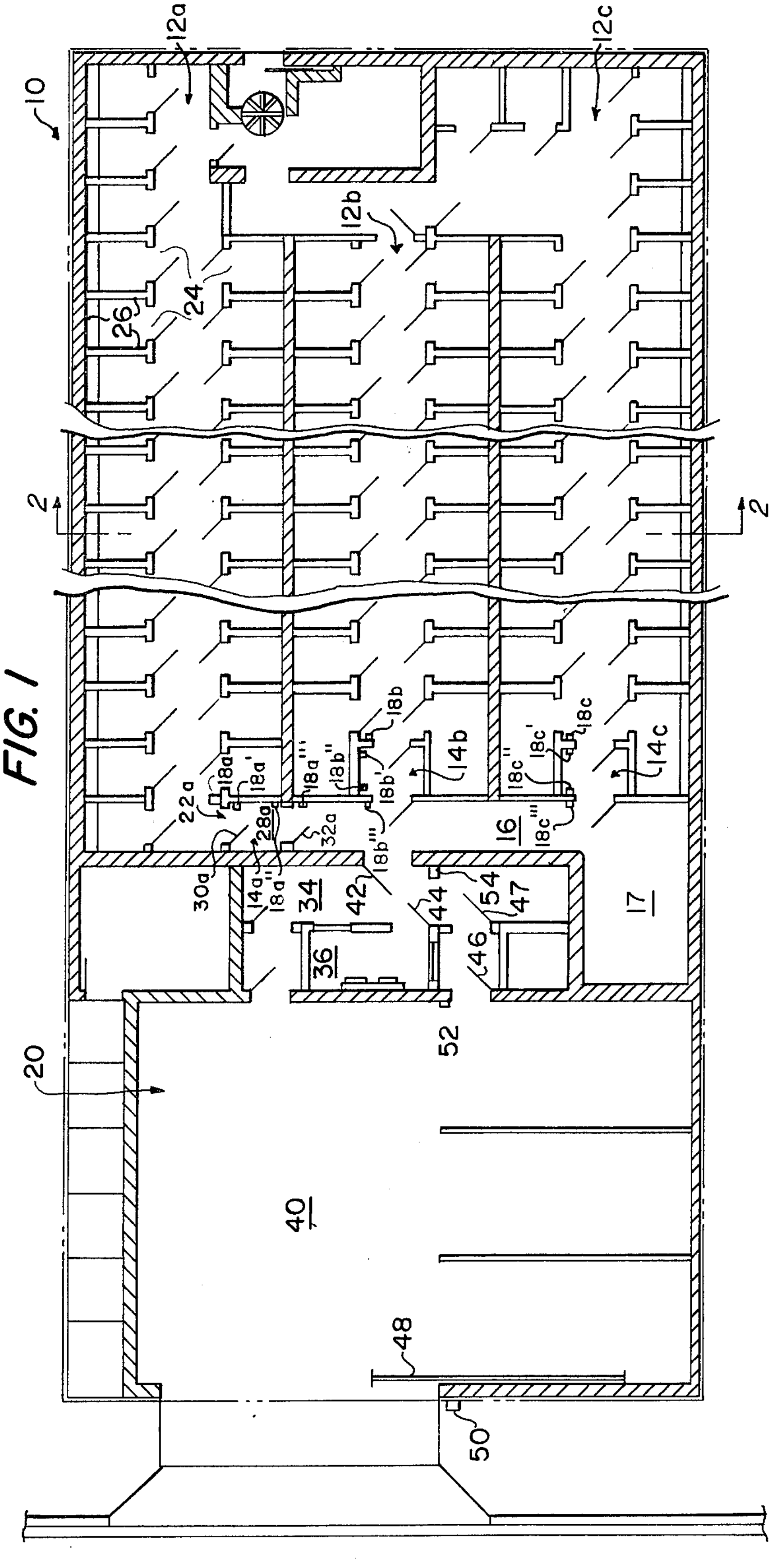
FIG. 1 is a plan view of the vault security system in accordance with the invention.
Figure 2:
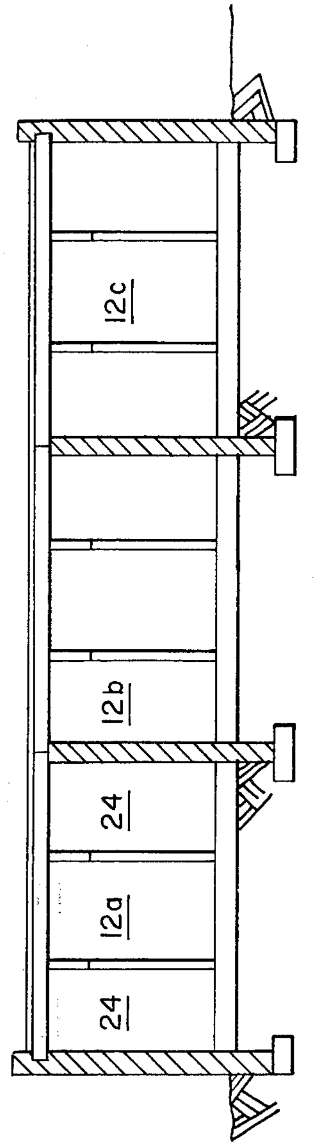
FIG. 2 is a cross-sectional view taken along line 2—2 of FIG. 1.
Figure 4:
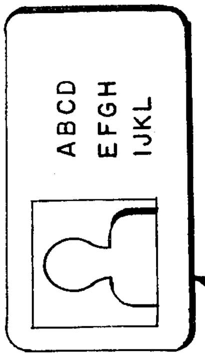
FIG. 4 is a plan view of a card that allows access to the vault security system.
Figure 3:
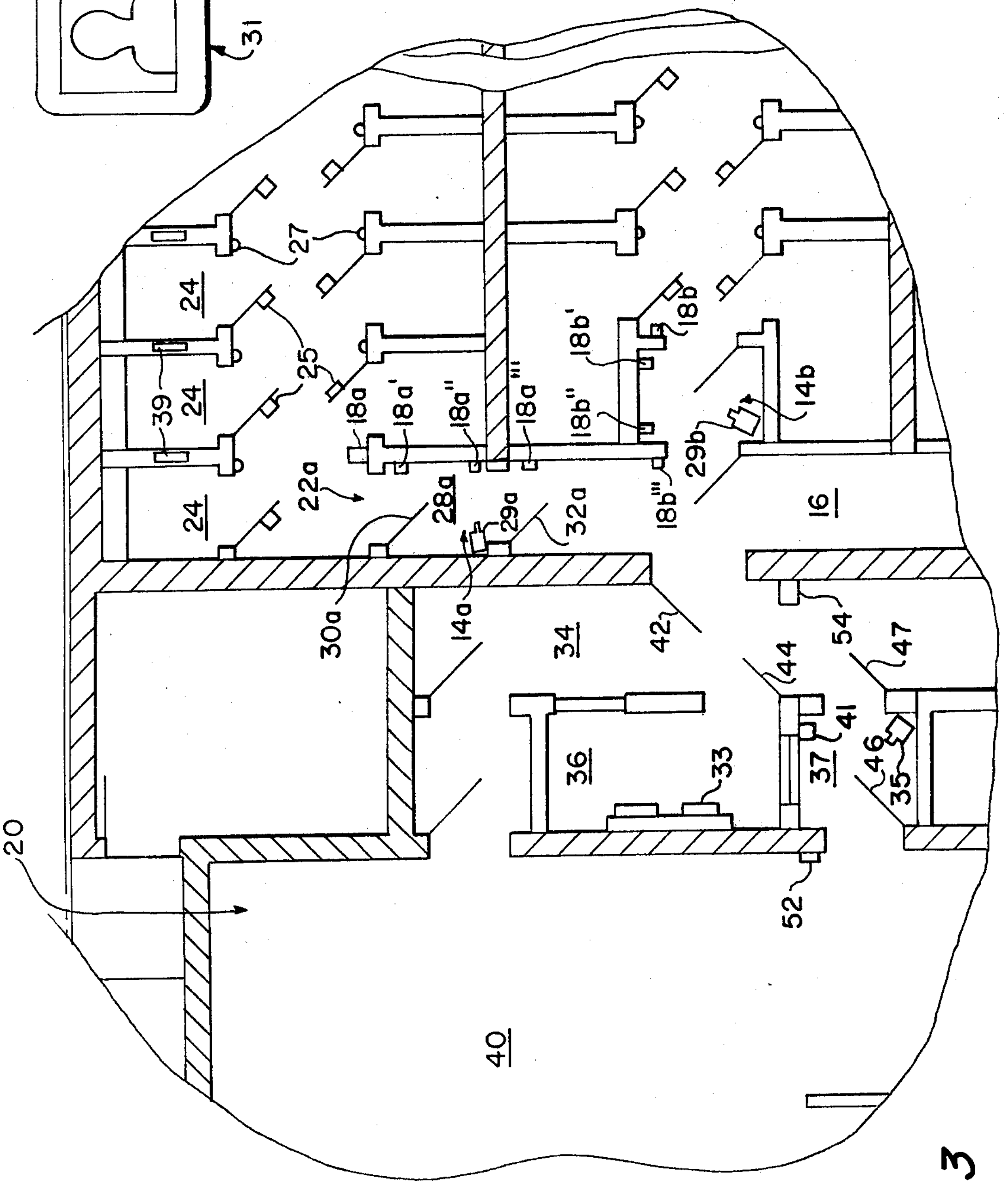
FIG. 3 is an enlarged plan view of a portion of FIG. 1.

With reference to the Figures and, in particular, to FIGS. 1 and 3, there is disclosed a presently preferred embodiment of vault security system 10. For purposes of description, vault security system 10 can be broken into the following functional units: a plurality of corridors, collectively designated 12 and individually designated 12*a*, 12*b*, 12*c*, etc., a plurality of holding mechanisms collectively designated 14 and individually designated 14*a*, 14*b*, 14*c*, etc., one holding mechanism 14 associated with each corridor 12, a common hall 16 which communicates with the plurality of corridors 12, a plurality of verification mechanisms collectively designated 18 and individually designated 18*a*, 18*a*′, 18*a*″, 18*a*‴, 18*b*, 18*b*′, 18*b*″, etc., and a main entrance system 20.

The plurality of corridors 12 and associated vaults accounts for a majority of the volume of vault security system 10. The corridors 12 may be arranged in any manner which is convenient. Assuming a one floor vault security system 10, corridors 12 may be parallel to each other and communicate with hall 16 as depicted in FIG. 1, or may radiate in any manner from common hall 16. It should also be understood that vault security system 10 can comprise a plurality of floors (not shown) each of which includes a plurality of corridors 12. Each of these floors would have a common hall such as common hall 16 and would be joined by a stairwell located in space 17.

An individual corridor 12a will now be described in detail, however, it should be noted the description of corridor 12a fully applies to corridor 12*b*, 12*c*, etc.

Corridor 12a has an entrance 22*a* located at one end thereof and a plurality of vaults 24 along the entire length thereof. Each vault 24 is used for the storage of valuables. Vaults 24 may be opened by a key (not shown) inserted into a lock (not shown), or by a combination lock which requires that a series of buttons be pushed in a proper sequence, or by the use of an access card reader 25 (FIG. 3) similar in operation to verification mechanism 18 (described below). Further each vault 24 will contain a second electronic lock 27 (FIG. 3) operable by an employee of vault system 10.

Vaults 24 are constructed of a plurality of walls 26. Each wall 26 has incorporated therein a sensing device such as, for example, devices 41 (FIG. 3) for sensing any penetration therethrough.

Holding mechanism 14*a* is located at the entrance 22*a* of corridor 12*a* and comprises a small room 28*a*, large enough to accommodate one person, a corridor door 30*a* and a hall door 32*a*. Corridor door 30a opens to entrance 22*a* of corridor 12a, and hall door 32*a* opens to hall 16. Both the corridor door 30a and the hall door 32*a* are equipped with a remotely controllable electronic lock (not shown). It should be understood that doors 30*a* and 32*a* may be designated so as to allow the entrance or exit of only one person at a time. Doors 30*a* and 32*a* can, for example, include bullet proof doors with windows.

Holding mechanism 14a is equipped with electronic video and audeo surveillance equipment 29*a* (FIG. 3) and may also be equipped with electronic sensing equipment (not shown) which indicates if more than one person is therein. Holding mechanism 14*a* is further equipped with verification mechanisms 18*a*, 18*a'*, 18*a''*, and 18*a'''*. It should be understood that verification mechanisms 18*a*, 18*a'*, 18*a''* and 18*a'''* may consist of one or a combination of mechanisms such as for example those disclosed in U.S. Pat. Nos. 3,403,380; 2,082,806; 3,441,808; 3,633,167; or 3,836,754.

For purposes of this description, verification mechanisms 18*a*, 18*a'*, 18*a''*, and 18*a'''* comprise identification card readers which are actuated by access mechanisms 31 which in this case are plastic cards which could, for example, be the size of a standard plastic credit card. Verification mechanisms 18a is located in corridor 12*a* adjacent to corridor door 30*a* and operated electronic locks (not shown) thereof. Verification mechanisms 18*a'* and 18*a''* are located inside holding mechanism 14*a*. Mechanism 18*a'* and 18*a''* are adjacent to doors 30*a* and 32*a*, respectively, and operate electric locks thereof. Mechanism 18*a'''* is located in common hall 16 adjacent to hall door 32*a* and operates an electric lock thereof.

Access to corridor 12a from common hall 16 is accomplished by placing any card compatible with vault system 10 in mechanism 18*a'''*. This releases hall door 32*a* and allows one person to enter holding mechanism 14*a*.

It should be noted that at all times at least one of the doors, 30*a* or 32*a*, is locked. Thus, only after door 32*a* closes, and becomes automatically locked may a card be successfully used to actuate mechanism 18*a'*. If a card compatable with mechanisms 18*a*, 18*a'* and 18*a''*, is placed in mechanism 18*a'*, corridor door 30a opens and the person can enter the corridor 12*a*. If a card incompatable with mechanism 18*a*, 18*a'* and 18*a''* is placed in mechanism 18*a'*, door 30*a* will not open and the person attempting to open door 30*a* will be trapped between locked doors 30*a* and 32*a* of holding mechanism 14*a* since the card will also be incompatable with mechanism 18*a''* which allows access to hall 16 through door 32*a*. The unauthorized person will be detained until his identity can be confirmed.

Access to common hall 16 from corridor 12*a* is accomplished with mechanisms 18*a* and 18*a''* in the same manner that access to corridor 12a was acccomplished with mechanism 18*a'''* and 18*a'*.

Finally vault security system 10 includes a main entrance system 20. Entrance 20 is comprised of four areas: a lobby 34, a guard area 36. a main entrance holding mechanism 37, and an automobile parking area 40. Lobby 34 is connected to common hall 16 by a vault door 42. Guard area 36 is located in lobby 34 and is accessible through door 44. Located in guard area 36 are video, audio and other electronic monitoring and recording devices, collectively denoted 33, which record all attempts whether successful or not to use verification mechanisms 50, 52, 54 (described below) and 18. Main entrance holding mechanism 37 is located next to guard area 36. Mechanism 37, which includes two doors, 46 and 47, is equipped with video picture instrumentation 35 and finger print verification instrumentation 39 for verification of an entrant. Door 47 connects mechanism 37 to lobby 34. Parking area 40 is connected to mechanism 37 by door 46. Finally, a sliding door 48 makes parking area 40 accessible from the exterior of system 10. Located proximal to doors 48, 46 and 44 are verification mechanisms 50, 52 and 54 respectively. These mechanisms 50, 52 and 54 are similar to mechanisms 18. Note that one card can be designed so that it can activate any combination of the verification mechanisms 18, 50. 52 and 54 by programming different areas of the card to specifically activate only certain of mechanisms 18, 50, 52 and 54. It is contemplated that all cards will activate verification mechanisms 50, 52, 54, 18*a'''*, 18*b'''*, 18*c'''* etc., and that only a certain subset of these cards will activate mechanisms 18*a*, 18*a'* and 18*a''* or 18*b*, 18*b'* and 18*b''* etc. Thus each card would allow access to one and only one of the corridors 12.

The operation of vault security system 10 is as follows: Access is gained to automobile parking area 40 by inserting a card in verification mechanism 50 thereby unlocking door 48. From area 40 access is gained to holding mechanism 37 by placing the card into mechanism 52. Once inside mechanism 37, the entrant is identified by the guard in guard room 36. If the video picture and finger print system verifies that the entrant is authorized to enter vault system 10, then the guard releases door 47, thereby allowing the entrant to pass into lobby 34.

From lobby 34 access is gained to common hall 16 by use of verification mechanism 54. Once inside common hall 16, a plurality of corridors 12 is presented. Each card will allow access into only one of these corridors 12. An authorized card user will have been previously told which corridor his card opens. The cards will in no way indicate which corridor to select. Since all cards will activate mechanisms 18*a'''* or 18*b'''* or 18*c'''* etc., access can be gained to any of the holding mechanisms 14. However, only certain cards actuate mechanisms 18*a'* or 18*b'* or 18*c'* and thus give access to corridors 12*a*, or 12*b* or 12*c* respectively. Thus a card programmed for corridor 12*b* will not allow access to corridor 12*a* by actuating mechanism 18*a'* and thereby opening door 30*a*, or access back to hall by activating mechanism 18*a''* and thereby releasing door 32*a*. Consequently, the card user is trapped in holding mechanism 14*a*. At this point the card user's identity will be established by audio and video systems located in holding mechanisms 14*a* and monitored in guard area 36. If the entrant has made an honest mistake in his selection of corridors, and is properly identified, he will be released and allowed to select the correct corridor, otherwise the entrant will be held until the proper authorities have been notified.

From the above discussion it becomes obvious that a minimum number of employees can operate vault system 10. Except for initial checks and malfunctions there is no need for an employee to use the video surveillance equipment until an entrant selects the wrong corridor 12. Thus during standard conditions, system 10 functions quite automatically allowing authorized card users to enter and exit with a minimum of delay.

Assuming now that a proper entry has been accomplished into, for example, corridor 12*a*, the entrant will proceed to his vault 24. As has been previously discussed, vaults 24 may have any number of locking systems. Assume, for example, that key locks are used with vaults 24. After the entrant inserts his key into the vault lock (not shown), a signal notifies the guards in guard area 36. The guards then inturn unlock a second electronic vault lock (not shown) and thereby give the entrant final access to vault 24.

Although the present invention has been described relative to an exemplary embodiment thereof, it will be understood by those skilled in the art that variations and modifications can be effected in these embodiments without departing from the scope and spirit of the invention.

I claim:

1. A vault security system, for the storage of valuables and the exclusion of unauthorized persons comprising:

a plurality of corridors each with an entrance;

a plurality of holding means, one of said holding means located at the entrance to each of said corridors for holding an unauthorized person, each of said holding means comprising a room with at least two doors, one of said doors being a corridor door openable so as to allow entry through said entrance into said corridor;

a common hall communicating with said plurality of holding means, one of said doors of said holding means being a hall door openable so as to allow entry into said holding means from said common hall, only one of said doors of said holding means openable at any one time; and a plurality of access means, each of said access means for opening from said common hall all of said hall doors for allowing access from inside said common hall to said plurality of holding means, each of said access means for opening, from inside only one of said plurality of holding means, said corridor door for allowing access to said corridor and said hall door for allowing access back to said common hall, said holding means for holding the unauthorized person attempting to enter any of said corridors through said holding means located at the entrance thereof with an access means that does not open said corridor door and said hall door from inside said holding means.

2. A vault security system in accordance with claim 1 further comprising verification means, said verification means including identification card readers, one of said card readers located in said common hall proximal to each of said hall doors, two of said card readers located inside each of said holding means, one proximal to each of said doors, and one of said card readers located in each of said corridors proximal to said corridor door, and wherein said plurality of access means includes a plurality of access identification cards, all of said cards for the activation of said verification means located in said common hall to allow access into all of said holding means, each of said cards for allowing access from only one of said holding means into said corridor by the activation of said verification means located proximal said corridor door and for allowing access from said same holding means back to said common hall by the activation of said verification means located proximal said hall door.

3. A vault security system in accordance with claim 1 wherein each of said corridors is lined with a plurality of vaults, each of said vaults having a plurality of sides, said sides being sensitive to penetration therethrough.

4. A vault security system in accordance with claim 3 wherein each vault includes a door having a first lock means and a second remotely controllable lock means.

5. A vault security system in accordance with claim 1 further comprising a sensing means located in said holding means for sensing when more than one person has entered said holding means and wherein said hall door and said corridor door only allows one person to enter said holding means at a time.

6. A vault security system in accordance with claim 2 further comprising:

a lobby;

a vault door connecting said lobby to said common hall;

a card reader located in said lobby proximal to said vault door, the entrance to said common hall from said lobby being by the insertion of said card into said lobby card reader;

a main entrance holding area;

a lobby door connecting said entrance holding area to said lobby;

a automobile parking area;

a parking area door connecting said parking area to said entrance holding area;

a card reader in said parking area located proximal to said parking area door, the entrance to said holding area from said parking area being by the insertion of said card into said parking area card reader;

a main entrance door to said parking area; and a card reader located proximal to said main entrance door, the entrance to said parking area through said entrance door being by the insertion of said card into said entrance door card reader.

7. A vault security system in accordance with claim 6 wherein said holding means, and said entrance holding area have installed therein audio and video surveillance equipment, and further comprising a guard room accessible from said lobby for monitoring said audio and video equipment and recording the incidences of use of said card readers, said entrance holding area for the identification of a person prior to the unlocking of said lobby door, thereby allowing access to said lobby.

* * * * *